United States Patent
Pham et al.

(10) Patent No.: US 6,891,820 B1
(45) Date of Patent: May 10, 2005

(54) UTILIZATION OF THE INTERNET PROTOCOL TO FACILITATE COMMUNICATION INVOLVING MOBILE DEVICES

(75) Inventors: Hiep Pham, San Diego, CA (US); Martin Morris, San Diego, CA (US); Rajiv Kumar, San Diego, CA (US); Lyn Nguyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/347,374

(22) Filed: Jul. 6, 1999

(51) Int. Cl.$^7$ ................................................. H04Q 7/24
(52) U.S. Cl. ...................................... 370/338; 370/401
(58) Field of Search ............................... 370/310, 310.2, 370/328–338, 351–3, 389–402, 431–437, 445, 403–409, 475, 395.2

(56) References Cited

U.S. PATENT DOCUMENTS

| | | | |
|---|---|---|---|
| 5,490,139 A | * | 2/1996 | Baker et al. ................. 370/312 |
| 5,572,528 A | | 11/1996 | Shuen |
| 5,636,216 A | | 6/1997 | Fox et al. |
| 5,652,751 A | | 7/1997 | Sharony |
| 5,678,531 A | * | 10/1997 | Byers et al. ............... 126/25 R |
| 5,696,903 A | | 12/1997 | Mahany |
| 5,699,353 A | | 12/1997 | Kent |
| 5,708,655 A | | 1/1998 | Toth et al. |
| 5,742,598 A | | 4/1998 | Dunn et al. |
| 5,754,547 A | | 5/1998 | Nakazawa |
| 5,812,531 A | | 9/1998 | Cheung et al. |
| 5,825,772 A | | 10/1998 | Dobbins et al. |
| 5,835,061 A | | 11/1998 | Stewart |
| 5,845,081 A | | 12/1998 | Rangarajan et al. |
| 5,850,592 A | | 12/1998 | Ramanathan |
| 5,854,899 A | | 12/1998 | Callon et al. |
| 6,473,413 B1 | * | 10/2002 | Chiou et al. ................. 370/331 |
| 6,574,266 B1 | * | 6/2003 | Haartsen ...................... 375/133 |

FOREIGN PATENT DOCUMENTS

| | | |
|---|---|---|
| EP | 0695059 A1 | 1/1996 |
| EP | A-0 695 059 | 1/1996 |
| WO | WO 99/14897 | 3/1999 |

OTHER PUBLICATIONS

Geneseo.edu—website: "PMDF System Manager's Guide—PMDF–REF–5.1; Overview of PMDF" (pp. 1 of 1; 1 of 2 and 2 of 2) (not included).

Haartsen, Jaap, "Bluetooth—the universal radio interface for ad hoc, wireless connectivity", Ericsson Review, Se, Ericsson (3) :110–117, (1998).

Haartsen, Jaap, "Bluetooth–The universal radio interface for ad hoc, wireless connectivity," Ericsson Review, No. 3, pp. 110–117, (1998).

"Specification of the Bluetooth System, Core, Version 1.0B," Bluetooth SIG Specifications, pp. 18–42, (Dec. 1, 1999).

(Continued)

Primary Examiner—David Vincent
(74) Attorney, Agent, or Firm—McAndrews, Held & Malloy, Ltd.

(57) ABSTRACT

A data communication system capable of forwarding IP-addressed data to devices as such devices move among networks having different IP addresses is disclosed herein. The system includes first and second networks containing first and second pluralities of nodes. At least one of the first plurality of nodes is adapted to receive data transmissions from an external IP-based network. Upon joining the first network, this device is assigned an IP address which remains with it irrespective of whether it moves beyond the range of the first network. When this device roams into the vicinity of the second network, data addressed to the device which is received at the first network is forwarded via at least one node of the second network to the device.

16 Claims, 3 Drawing Sheets

OTHER PUBLICATIONS

Bluetooth Adopter's website: "Specification of the Bluetooth System" v.0.8 Jan. 22, 1999 (pp. 1–224).

Geneseo.edu—website: "PMDF System Manger's Guide—PMD–REF–5.1; Overview of PMDF" (pp. 1 of 1; 1 of 2 and 2 of 2).

Haartsen, Jaap, "Bluetooth–The universal radio interface for *ad hoc*, wireless connectivity," *Ericsson Review*, No. 3, pp. 110–117, (1998).

* cited by examiner

UTILIZATION OF THE INTERNET PROTOCOL TO FACILITATE COMMUNICATION INVOLVING MOBILE DEVICES

CROSS REFERENCE TO RELATED PATENT APPLICATIONS

The entire disclosures of copending U.S. Patent Application entitled "Distributed Management of an Extended Network Containing Short-Range Wireless Links" and copending U.S. Patent Application entitled "Implementation of Power Control in a Wireless Overlay Network", both filed on even date herewith, are hereby incorporated by reference.

FIELD OF THE INVENTION

The present invention relates generally to communication systems, and more particularly to a method and associated apparatus for allowing a device to continue communication via the Internet Protocol ("IP") even while moving among networks having different associated IP addresses.

BACKGROUND OF THE INVENTION

Computer networks allow multiple computers, peripherals and other information storage, retrieval or processing devices to share data. Each device attached to a network is typically referred to as a node on the network, or a node that is part of the network. Local Area Networks ("LANs") have historically consisted of nodes interconnected by physical telecommunications media (e.g., coaxial cable, twisted pair wire, or fiber optics). Recently wireless LANS, the nodes of which are not connected by means of a physical medium, have started to appear in the market. These wireless LANs communicate by means of infra-red (IR), radio or other signals. One of the benefits of using wireless LANs is that cabling is not required. This is a particularly useful feature for mobile nodes such as laptop and notebook computers, PDAs (personal digital assistants), and the like. If equipped with an appropriate wireless adapter, the mobile nodes can move around within a predefined coverage area and remain connected to the network.

In order for the nodes of a particular network to be able to communicate with each other, some sort of common addressing scheme must be implemented. In a traditional wired network, one very common method of communicating between nodes is to utilize Internet Protocol ("IP") addressing. When a node initially joins a network operating with the Internet Protocol, it is assigned an IP address consisting of at least two portions: a network address and a destination address. IP addresses are typically fixed and remain with the node irrespective of whether the node relocates to another network. In a traditional wired network, the fixed nature of IP addresses is not problematic because nodes are stationary and consequently do not migrate to networks outside of their original home network. Recently, wireless nodes have been added to traditionally hard-wired networks. Like all devices adhering to the Internet Protocol, mobile devices are accorded IP addresses having a network portion and a device portion. The network portion identifies the mobile device's "home network" while the device portion distinguishes the mobile device from other members of its home network. The routing of data packets through the Internet is generally exclusively based upon the network portion of the destination IP address. Specifically, Internet routers extract the destination network address from a given data packet and then forward that packet to the appropriate network. Once the packet reaches the appropriate network, the network server examines the device portion of the IP address and forwards the packet to the appropriate device.

When a mobile device is located in its home network, data packets addressed to a particular mobile device are simply sent to such device upon being received at the home network's access point. This process is transparent to the user so long as the mobile unit is located within range of its home network. However, when the mobile device travels outside of its home network data packets cannot easily be forwarded thereto and are often "dropped", which results in loss of data.

Several methods have been proposed to allow mobile devices to continue. IP-based communication even when moving between networks having different IP addresses. One such technique requires that the mobile unit report changes in its address to the access point or network manager in its home network. A router located in its home network stores each new IP address for the mobile unit and forwards any incoming packets to the mobile device's new IP address. An alternate approach involves establishing a pseudo presence, also called a "spoofed address," at the mobile's home network location. However, when mobile devices frequently move between networks having different IP addresses, these address-mapping and forwarding techniques can result in packets being forwarded to multiple locations, which may cause confusion and loss of data

SUMMARY OF THE INVENTION

Briefly, therefore, the present invention relates to a data communication system capable of forwarding IP-addressed data to devices as such devices move among networks having different IP addresses. The present invention includes first and second networks containing first and second pluralities of nodes. At least one of the first plurality of nodes is adapted to receive data transmissions from an external IP-based network. Upon joining the first network, this device is assigned an IP address which remains with it irrespective of whether it moves beyond the range of the first network (i.e., the device's "home" network). When this device roams into the vicinity of the second network, data addressed to the device which is received at the first network is forwarded via at least one node of the second network to the roaming device.

In a preferred embodiment, each of the nodes in the first and second networks broadcast messages indicating the services that it offers and the nodes that are within its range. These broadcasts allow the mobile device to determine which devices it can use to create a connection between itself and the local access point in its home network. When the mobile device moves beyond its home network, it reestablishes a connection to its local access point using whatever combination of nodes it deems as being most efficient. Once this connection is made, the local access point is able to forward data to the mobile device.

In an alternate embodiment, an internetworking node participates in both the first and second networks, and receives a first set of network information relating to the first network from the first plurality of nodes. In an another embodiment, the mobile device is capable of anticipating when it is about to lose contact with one of the nodes that is providing a connection between it and its home local access point. When the mobile device makes this determination, it attempts to establish an alternative route for the connection to its local access point. If the mobile device is of a type requiring continuous connection to an external network, an additional embodiment allows the mobile device to simultaneously maintain more than one connection between itself and its local access point. This minimizes the risk that data packets addressed to the mobile device will be "dropped".

DETAILED DESCRIPTION OF THE INVENTION

The present invention is more fully described with reference to FIGS. 1–3. An exemplary implementation of the invention is discussed and illustrated with reference to its implementation using wireless networks predicated on the proposed "Bluetooth" wireless communications protocol. This protocol contemplates the grouping of physically proximate wireless nodes, and is described in *Specification of the Bluetooth System*, v0.8, Jan. 22, 1999 (and in subsequent revisions thereof). It should be understood that this invention is not limited to such a wireless protocol, and could be similarly implemented using other types of fixed or wireless networks. As is described hereinafter, the present invention discloses a method and apparatus for relaying data addressed to a mobile device nominally associated with a first network when such device becomes associated with other networks.

Figure 1:
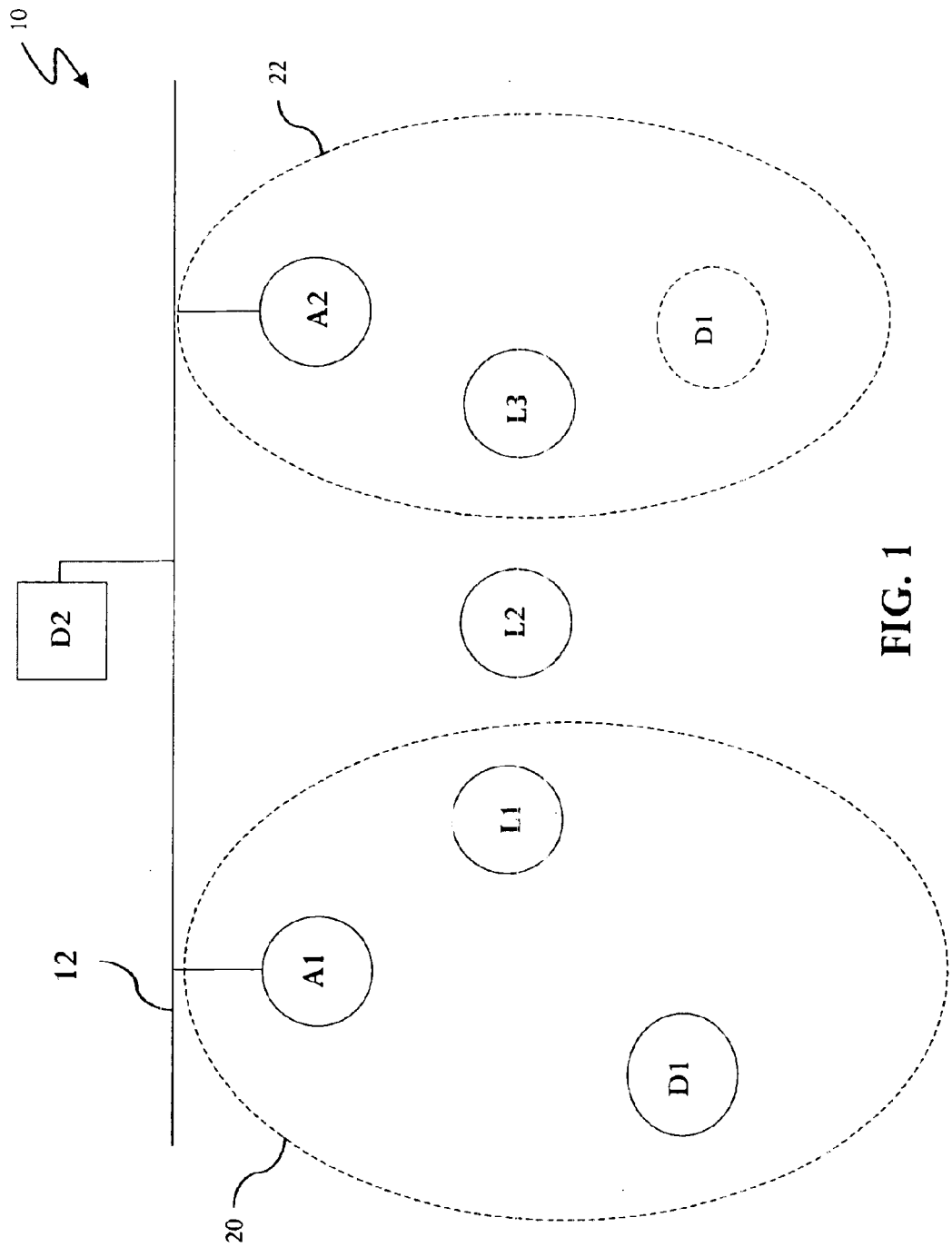
FIG. 1 shows a data communication system comprising two wireless networks and a means for forwarding data between the networks.

FIG. 1 illustrates a data communication system 10 consisting of a hard-wired network 12 and first and second wireless networks 20 and 22 containing network nodes A1 and A2 respectively. The first and second wireless networks 20 and 22 each contain a plurality of wireless nodes. For purposes of clarity, only wireless nodes L1 and L3 are depicted in wireless networks 20 and 22. It should nonetheless be understood that the present invention is equally applicable to implementations in which first and second wireless networks include numerous wireless nodes. The system 10 also contains a relay node L2 connecting the two wireless networks, a first mobile device D1, and a hard-wired device D2 connected to the hard-wired network 12. In a typical configuration, D2 would actually be a network of devices rather than a single device. The device D2 may comprise either a network of devices or simply a single device. Since the actual number of devices represented by D2 is irrelevant for purposes of explanation of the present invention, device D2 will hereinafter be referred to as a single device.

For purposes of illustration, it is assumed that certain of the wireless nodes depicted in FIG. 1 are mobile relative to one another. In the network architecture of FIG. 1, each node within the first network 20 is within the wireless coverage area of network access node A1 and each node within the second network 22 is within the wireless coverage area of network access node A2. The network access nodes A1 and A2 serve as conduits to the external network 12 for the first and second wireless networks 20 and 22, respectively. The access nodes A1 and A2, as well as a relay node L2, are also disposed for wireless communication with the nodes L1 and L3.

Because the nodes within the wireless networks 20 and 22 are not necessarily within transmission range of all the other wireless nodes within the same networks, each wireless node may not be able to monitor all of the traffic within its network. For example, wireless node L1 may be able to "listen" to wireless node L2 but may not be able to monitor transmissions from wireless node L3. In a preferred implementation each wireless node transmits an advertisement identifying its address and the services it offers. Each such advertisement also incorporates the address of all other wireless nodes from which advertisements are received by the node transmitting a given advertisement. Based on this information, the mobile device D1 can determine all nodes participating in the networks and the service offered by each. As used herein the term "services" encompasses, without limitation, the capability of a given node to relay message information to and from one or more outside networks. Accordingly, the advertisement issued by each wireless node may also identify the other networks within which the wireless node is capable of communication and the services offered by each.

Referring to FIG. 1, when D1 first seeks to join the first wireless network 20 it transmits a signal to the network access node A1 via wireless node L1 so that it can be assigned an IP address by the Internet Service Provider ("ISP") providing network access via node A1. Through this transmission, device D1 establishes the first wireless network 20 as its home network; that is, it designates the network address of the first wireless network 20 as its network address. Because device D1 is not hard-wired to node A1, it is necessary for device D1 to access node A1 via a wireless communication link. In the exemplary implementation of FIG. 1, device D1 determines that it can establish a connection to node A1 through node L1 by listening to the periodic advertisements issued by nodes A1 and L1. As was mentioned above, these broadcasts contain network connectivity information pertinent to of all of the devices within range of A1 and L1. For example, A1's broadcast would indicate that it is connected to the hard-wired network 12, and is capable of communication with nodes L1 and L2. Similarly, node L1's broadcast would reveal that it is within range of, and capable of communication with, nodes A1, L2 and D1.

Data may be routed to node D1 in a conventional manner when node D1 is within its home network 20. In this situation data destined for node D1 is sent to the IP address of node A1 from the external network 12. On the basis of the advertisements broadcast by L1, node A1 determines that node L1 has established a connection to D1. Node A1 then sends the data received from the external network 12 to node D1 via node L1.

Routing data to D1 using IP addressing becomes problematic when D1 moves outside of its home network 20, since node D1's IP address does not automatically change to reflect its new location within a different network. As a consequence, all the data intended to be sent to node D1 will continue to be routed over the external network 12 to node A1. If node A1 does not have a separate connection to device D1 when data packets arrive, node A1 will either drop the data packets or queue them for retransmission on the assumption that D1 will establish a new connection with A1.

Referring to FIG. 1, when D1 relocates to a position within the wireless coverage area of network 22 it listens to the connectivity information broadcast by the nodes within its range (device D1 is shown in phantom in network 22). If device D1 becomes located sufficiently near node L3, it may listen to its connectivity advertisement and determine a path over which data may be routed from node A1. After making this determination, D1 requests a connection to node A1 via a node along the chosen path (e.g., node L3). In order to establish a connection between nodes D1 and A1, node L3 establishes a connection to node L2 which in turn establishes a connection to node A1. Once these connections have been made, node A1 will forward any data packets addressed to D1 that it has received over the hard-wired network 12.

Figure 2:
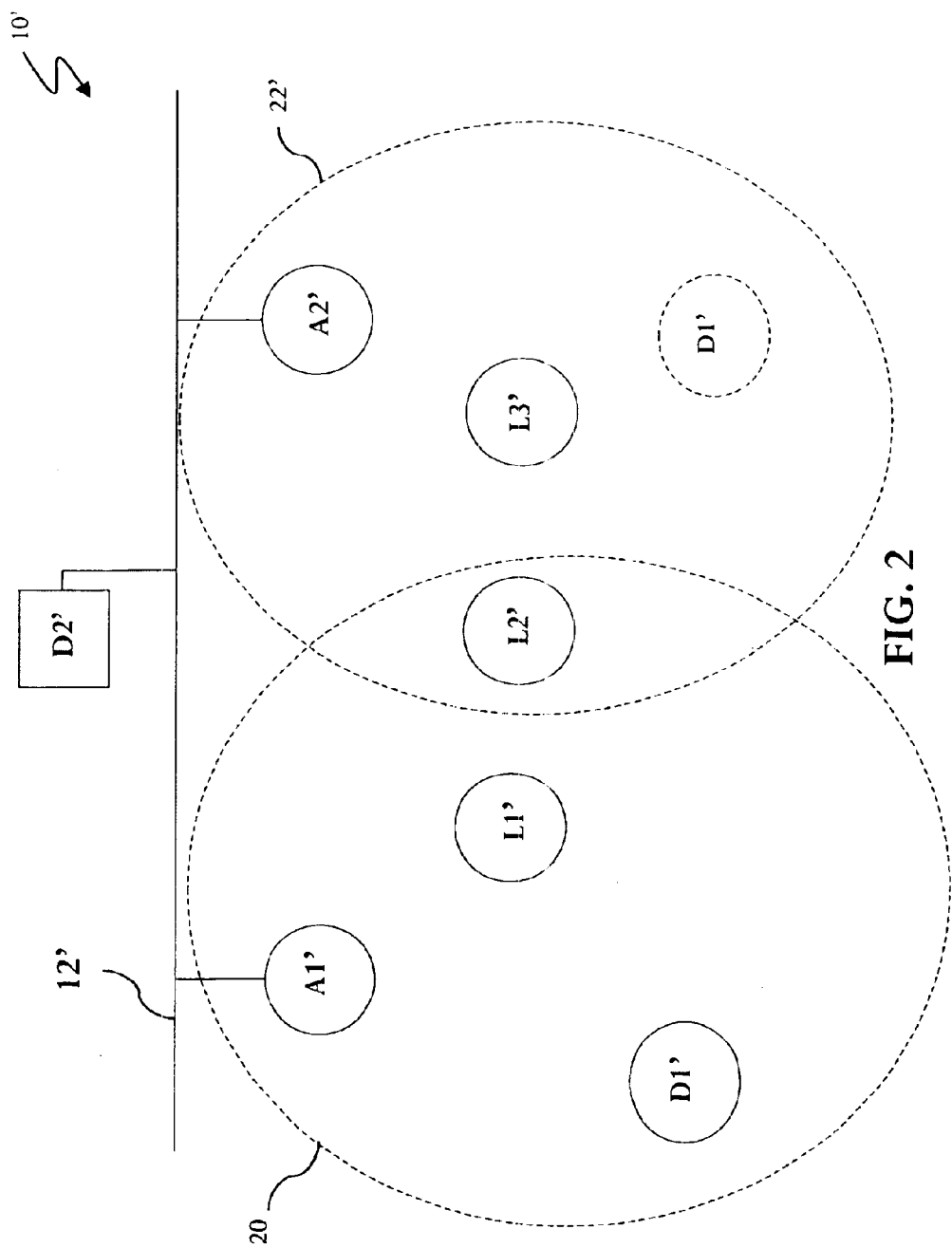
FIG. 2 contains a data communication system consisting of two wireless networks and an internetworking node in accordance with a preferred embodiment of the present invention.

FIG. 2 depicts an alternate embodiment of the present invention in which a wireless node L2' exists as a member of both first and second wireless networks 20' and 22'. The node L2' facilitates internetworking between the networks 20' and 22' in the manner described in the aforementioned copending Patent Application entitled "Distributed Management of an Extended Network Containing Short-Range Wireless Links". The wireless node L2', or "internetworking node", understands the protocols of both the first and second wireless networks 20' and 22' and is capable of transparently relaying data traffic therebetween.

Referring again to FIG. 2, once device D1' begins moving outside of its home network 20' it may anticipate the loss of its connection to the network access node A1'. This is because device D1' monitors the signal strength of the advertisements being transmitted from L1', and will take notice when this signal strength drops below a predefined threshold. Once device D1' determines that a dropped connection between itself and node L1' is imminent, it will "listen" to the advertisements being broadcast by other wireless nodes within its range to determine if it can establish a simultaneous connection to node A1'. In the exemplary implementation of FIG. 2, device D1' determines that it may establish communication with node A1' via node L2'. Accordingly, device D1' then drops its connection with L1' after establishing a connection with node L2'. In this way device D1' endeavors to minimize the risk of loss of data packets by briefly maintaining a simultaneous connection to two distinct wireless nodes. In applications where preventing any loss of data packets is very important, device D1' may maintain such a simultaneous connection continuously or for substantially longer periods of time.

Figure 3:
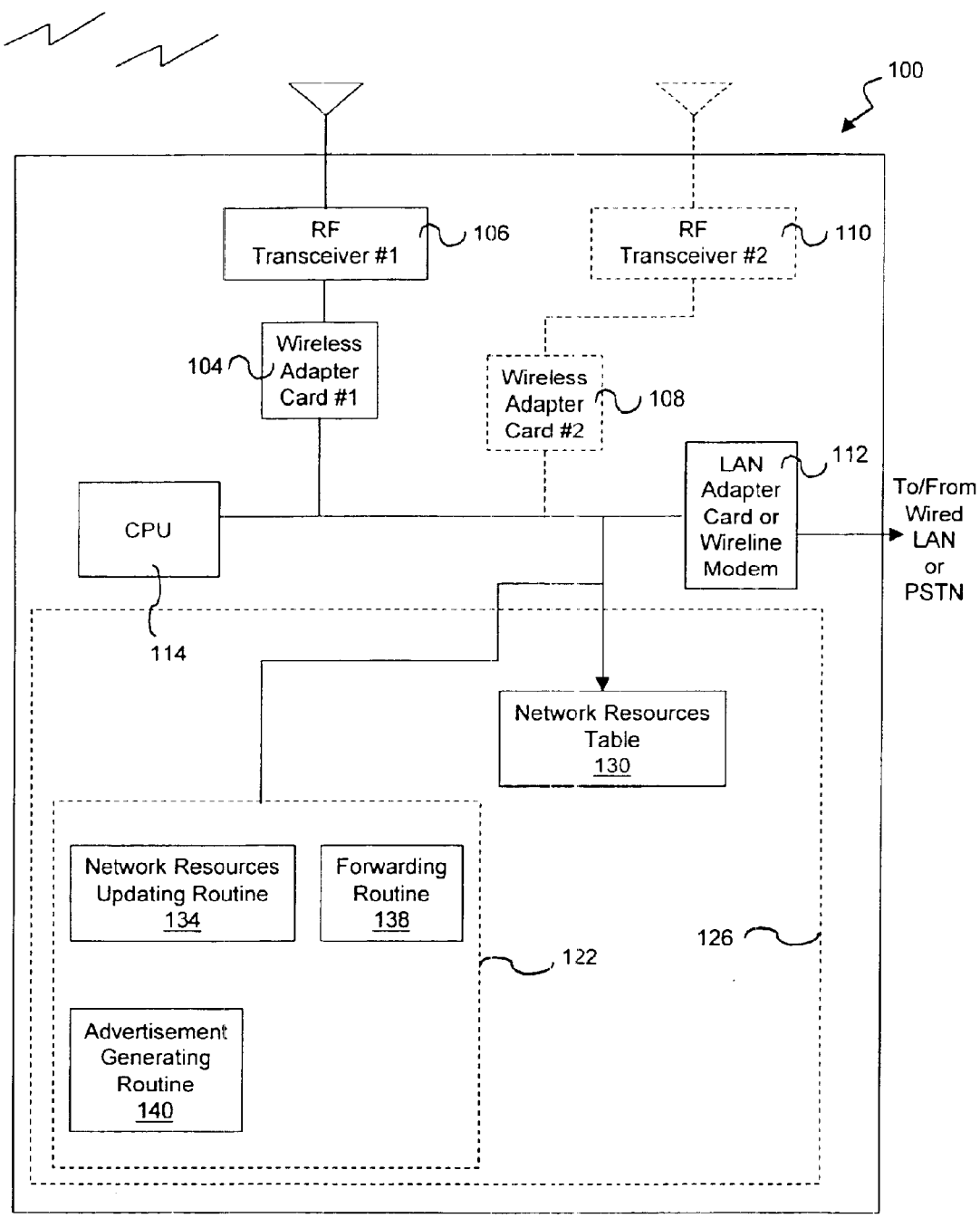
FIG. 3 is a block diagram illustratively representing the components of a wireless node and associated software configured in accordance with a preferred embodiment of the present invention.

FIG. 3 is a block diagram illustratively representing the components of a wireless node 100 and associated software configured in accordance with a preferred embodiment of the present invention. Referring to FIG. 3, the wireless node 100 may be in the form of an electronic device (e.g., a laptop or desktop computer, hand-held electronic organizer, or printer) containing a first wireless adapter card 104 and a first RF transceiver 106 disposed for communication in accordance with a first network communication standard. The wireless node 100 may also optionally include a second wireless adapter card 108 and a second RF transceiver 110 for communicating in accordance with a second network communication standard. The second wireless adapter card 108 and the second RF transceiver 110 may be included within the wireless node 100 when, for example, it is anticipated that the wireless node may participate in networks operative in accordance with different network standards. For example, internetworking node L2' would preferably be configured with different wireless transceiver and associated adapter cards to the extent the first network 20' and second network 22' were governed by differing network communication standards. The wireless node 100 may also include a LAN adapter card 112 for facilitating communication with a wired LAN, or alternately a wireline modem for effecting communication through the PSTN.

Each wireless adapter card and transceiver is controlled by a CPU 114 operative to execute program instructions of the various software routines 122 stored in memory 126. Within wireless nodes, a network resources table 130 is updated in response to internet management broadcasts by transmitting nodes of the individual wireless networks. The network resources table 130 stores the network address and services offered by each wireless node. In the case of internetworking node L2', these advertised services may include the services provided by a wireless node from a neighboring network in communication with the internetworking node.

Included among the software routines 122 within internetworking nodes is a forwarding routine 138 for forwarding messages to the wired LAN via the LAN adapter card 112, or to another wireless node via one of the wireless transceivers 106, 110 and associated wireless adapter card 104, 108. An advertisement generating routine 140 operates to generate the advertisements issued by the wireless node 100 which specify its network address and services offered.

Although the above application has been described primarily with reference to specific embodiments, one skilled in the art can readily appreciate that the teachings of the present invention may be applied in other communication contexts. For example, in certain embodiments the first and second wireless networks described above could instead comprise networks of fixed devices linked by hard-wired local area networks ("LANs"). Assuming a wireless or other communication link could be established between a pair of devices within the different networks, data could be forwarded among such networks in accordance with the invention upon movement of a device from one network to the other. Thus the application is meant only to be limited by the scope of the appended claims.

What is claimed is:

1. A data communication system comprising:
   a first network including a first network access point and a first plurality of nodes;
   a second network including a second network access point and a second plurality of nodes; and
   means for forwarding, from said first network to said second network via a wireless internetwork path, message information received at said first network and addressed to a first wireless node of said first plurality of nodes when said first wireless node establishes communication with said second network wherein said wireless internetwork path includes one or more wireless connections involving at least one of said first plurality of nodes and at least one of said second plurality of nodes to the exclusion of said first network access point and said second network access point.

2. The data communication system of claim 1 wherein said wireless internetwork path includes an internetworking node included within said first plurality of nodes and within said second plurality of nodes.

3. The data communication system of claim 2 wherein said internetworking node includes:
   means for receiving a first set of network information relating to said first network from said first plurality of nodes, said first set of network information identifying said first network access point wherein said message information is available from said first network access point; and
   means for transmitting, to one of said second plurality of nodes, said first set of network information and an identity of said internetworking node.

4. The data communication system of claim 3 wherein said one of said second plurality of nodes includes means for broadcasting said first set of network information, said first wireless node including means for receiving said first set of network information broadcast by said one of said second plurality of nodes upon establishing communication with said second network.

5. The data communication system of claim 1 wherein said means for forwarding includes means for transmitting said message information over one of said wireless connections.

6. A data communication system comprising:
   a first network including a first plurality of wireless nodes, said first network having a first network access point for receiving message information directed to said first network;
   a second network including a second network access point and a second plurality of wireless nodes; and
   an internetworking node configured to forward portions of said message information addressed to one of said first plurality of wireless nodes via a wireless interconnection path from said first network access point to said second network when said one of said first plurality of nodes establishes communication with said second network, said wireless internetwork path including one or more wireless connections involving at least one of said first plurality of wireless nodes and at least one of said second plurality of wireless nodes to the exclusion of said first network access point and said second network access point.

7. A data communication system comprising:
   a first wireless network including a first network access point and a first plurality of wireless nodes, said first network access point providing a first IP address to a first wireless node of said first plurality of wireless nodes upon said first node joining said first wireless network;
   a second network including a second plurality of wireless nodes; and
   means for forwarding, from said first wireless network to said second wireless network via a wireless internetwork path, message information received at said first wireless network and addressed to said first IP address when said first wireless node establishes communication with said second wireless network wherein said wireless internetwork path includes a wireless connection between at least one of said first plurality of wireless nodes and at least one of said second plurality of wireless nodes to the exclusion of said first network access point and said second network access point and is defined based at least in part upon a connectivity advertisement broadcast by one of said second plurality of wireless nodes.

8. The data communication system of claim 7 wherein said wireless internetwork path includes an internetworking node included within said first plurality of wireless nodes and within said second plurality of wireless nodes.

9. The data communication system of claim 7 wherein said first wireless node is configured to determine said wireless internetwork path based upon said connectivity advertisement and an additional connectivity advertisement broadcast by one of said first plurality of wireless nodes.

10. The data communication system of claim 1 wherein said first wireless node is configured to determine said wireless internetwork path based upon said connectivity advertisement and an additional connectivity advertisement broadcast by one of said second plurality of wireless nodes.

11. A method of data communication comprising:
    broadcasting, from a first node of a first plurality nodes included within a first wireless network, a connectivity advertisement identifying its address and one or more additional addresses corresponding to other of said first plurality of nodes;
    determining a wireless internetwork path based at least in part upon said connectivity advertisement, said wireless internetwork path including one or more wireless connections involving at least one of said first plurality of nodes and at least one of a second plurality of nodes of a second wireless network wherein said one or more wireless connections are defined to the exclusion of a first network access point associated with said first wireless network and a second network access point associated with said second wireless network; and
    forwarding, from said first wireless network to said second wireless network via said wireless internetwork path, message information received at said first network and addressed to said first node when said first node establishes communication with said second network.

12. The method of claim 11 further including:
    receiving, at an internetworking nodes included within said first plurality of nodes and said one or more nodes of said second wireless network, a first set of network information relating to said first network from said first plurality of nodes, said first set of network information identifying said first network access point wherein said message information is available from said first network access point; and
    transmitting, to one of said one of more nodes of said second wireless network, said first set of network information and an identity of said internetworking node.

13. The method of claim 12 further including broadcasting, from said one of said second plurality of nodes, said first set of network information and receiving, at said first node, said first set of network information broadcast by said one of said second plurality of nodes upon establishing communication with said second network.

14. A method for data communication comprising:
    receiving, at a first wireless node of a first plurality of wireless nodes of a first wireless network, a first IP address upon association of said first wireless node with said first wireless network;
    terminating, at said first wireless node, a first network connection with said first wireless network and establishing a second network connection with a second wireless network upon determining at said first wireless node that signal strength over said first network connection has become less than a minimum threshold;
    defining, at said first wireless node, a wireless internetwork path including one or more wireless connections involving at least one of said first plurality of wireless nodes and at least one of a second plurality of wireless nodes of said second wireless network wherein said one or more wireless connections are defined to the exclusion of a first network access point of said first wireless network and a second network access point of said second wireless network; and
    receiving, at said first wireless node, message information forwarded from said first wireless network to said second wireless network via said wireless internetwork path, said message information being previously received at said first wireless network and addressed to said first IP address.

15. The method of claim 14 wherein said defining is based at least in part upon a connectivity advertisement broadcast by one of said second plurality of wireless nodes.

16. The method of claim 15 wherein said defining is further based upon an additional connectivity advertisement broadcast by one of said first plurality of wireless nodes.

* * * * *